United States Patent Office 3,755,439
Patented Aug. 28, 1973

3,755,439
METHOD OF PREPARING ALKANESULFONAMIDES FROM ALKANESULFONYL CHLORIDES
Carl D. Kennedy, Ponca City, Okla., assignor to Continental Oil Company, Ponca City, Okla.
No Drawing. Filed Oct. 14, 1971, Ser. No. 189,332
Int. Cl. C07c *143/74*
U.S. Cl. 260—556 A        6 Claims

ABSTRACT OF THE DISCLOSURE

The present invention relates to a method of preparing alkanesulfonamides from the alkanesulfonyl chloride reaction mixture obtained by the sulfochlorination of a paraffin hydrocarbon. The alkanesulfonyl chloride mixture is added to an excess of a nitrogen base compound selected from the group consisting of ammonia and amines to form an alkanesulfonamide product mixture. By the present invention the alkanesulfonamide product mixture is heated to a temperature of from about 20° C. to about 200° C. at a pressure of from about 1 to about 350 atmospheres for a period of time sufficient to convert chain chlorinated alkane sulfonamide compounds contained in the product mixture to aminoalkanesulfonamides. Once formed, the aminoalkanesulfonamides may be removed from the product mixture by extraction.

BACKGROUD OF THE INVENTION

(1) Field of the invention

The present invention relates to an improved method of preparing alkanesulfonamides, and more particularly, but not by way of limitation, to an improved method of preparing alkanesulfonamides from the alkanesulfonyl chloride reaction mixture obtained by the sulfochlorination of a paraffin hydrocarbon.

(2) Description of the prior art

Alkanesulfonamides have heretofore been produced by reacting a nitrogen base compound such as ammonia or an amine with the sulfonyl chloride reaction mixture obtained by reacting a paraffin hydrocarbon with chlorine and sulfur dioxide under the action of ultraviolet light (sulfochlorination). The crude liquid reaction mixture produced by the sulfochlorination of an alkane hydrocarbon is comprised of alkanesulfonyl chloride compounds as well as minor amounts of chain halogenated alkanesulfonyl chloride compounds, halogenated hydrocarbons and other byproduct impurities. While a variety of methods of purifying the sulfochlorination reaction mixture have been developed which may be utilized prior to the preparation of alkanesulfonamides therefrom, chain chlorinated alkanesulfonyl chlorides are not readily removed from the reaction mixture, and as a result, chain chlorinated alkanesulfonamides are produced.

The procedure most commonly used for carrying out the reaction of the alkanesulfonyl chloride reaction mixture with ammonia or amines is to add the sulfonyl chloride mixture to an excess of the ammonia or amine under a pressure of from about 1 to about 250 atmospheres at a temperature of less than about 0° C. with good stirring. This technique is described in F. Asinger, Paraffins, Chemistry and Technology, Pergamon Press, New York, (English Translation), page 557, and is utilized to obtain a product mixture having a low content of disulfonimide compounds. However, the alkanesulfonamide product mixture still contains chain chlorinated alkanesulfonamide compounds. By the present invention, an improved method of preparing alkanesulfonamides from the sulfochlorination reaction mixture is provided wherein chain chlorinated alkanesulfonamide compounds are converted to aminoalkanesulfonamides, which, if desired, may be readily removed from the product mixture.

SUMMARY OF WITH INVENTION

The present invention relates to an improved method of preparing alkanesulfonamides from the alkanesulfonyl chloride reaction mixture obtained by the sulfochlorination of a paraffin hydrocarbon wherein the reaction mixture is added to an excess of a nitrogen base compound selected from the group consisting of ammonia and amines at a pressure of from about 1 to about 250 atmospheres and a temperature below about 0° C. to form an alkanesulfonamide product mixture essentially free of disulfonimide compounds. The alkanesulfonamide product mixture formed is heated to a temperature of from about 20 to about 200° C. at a pressure of from about 1 to about 350 atmospheres thereby converting chain chlorinated alkanesulfonamide compounds contained in the product mixture to aminoalkanesulfonamides.

It is, therefore, a general object of the present invention to provide an improved method of preparing alkanesulfonamides from the sulfonyl chloride reaction mixture obtained by the sulfochlorination of a paraffin hydrocarbon.

A further object of the present invention is the provision of an improved method of preparing alkanesulfonamides from an alkanesulfonyl chloride reaction mixture obtained by the sulfochlorination of a paraffin hydrocarbon wherein chain chlorinated alkanesulfonamides contained in the product mixture are converted to aminoalkanesulfonamides.

Another object of the present inveniton is the provision of an improved method of preparing a high purity alkanesulfonamide product mixture from the reaction mixture obtained by the sulfochlorination of a paraffin hydrocarbon which is relatively free of chain chlorinated alkanesulfonamides.

Other and further objects, features and advantages of the present invention will be readily apparent upon a reading of the following description of preferred embodiments of the invention.

DESCRIPTION OF THE PREFERRED EMBODIMENTS

In addition to alkanesulfonyl chloride compounds, the crude reaction mixture obtained by the combined reaction of sulfur dioxide and chlorine with an alkane hydrocarbon compound or a mixture of alkane hydrocarbon compounds contains minor amounts of chain chlorinated alkanesulfonyl chloride compounds as well as a variety of other byproduct impurities. While various methods of purifying paraffin sulfochlorination reaction mixtures have been developed such as extraction with selective solvents, etc., chain chlorinated alkanesulfonyl chloride compounds are not readily removed and remain in the mixture. That is, solvents such as nitromethane, methylformate and liquid sulfur dioxide have been used to advantage as selective solvents for separating the sulfonyl chloride products from unreacted hydrocarbons, halogenated hydrocarbons and the like. In addition, crystallization and distillation techniques may be utilized to further purify the crude reaction mixture. However, the extracted and otherwise purified alkanesulfonyl chloride mixture produced still contains chain chlorinated alkanesulfonyl chloride compounds. Due to the similarity in physical properties of the sulfonyl chloride compounds, they cannot be readily separated by conventional methods, and consequently, the entire sulfonyl chloride mixture is usually employed in industrial applications for the preparation of sulfonamide derivatives.

Heretofore, the procedure generally utilized for preparation of alkanesulfonamides from the alkanesulfonyl chloride mixture has been the addition of the sulfonyl chloride mixture to an excess of ammonia or an amine under pressure at a relatively low temperature, i.e., a temperature of from about −5° C. to about 0° C., with good stirring. By maintaining the temperature below about 0° C. the formation of disulfonimide compounds is maintained at a minimum level. However, chain chlorinated alkanesulfonamide compounds are formed and remain in the product mixture. By the present invention, these chain chlorinated sulfonamide compounds are converted to aminoalkanesulfonamides which are useful in a mixture with alkanesulfonamides, or, if desired, the aminoalkanesulfonamides may be removed from the product mixture.

Broadly described, the present invention comprises heating the alkanesulfonamide product mixture containing chain chlorinated alkanesulfonamide compounds so that the chain chlorinated alkanesulfonamide compounds are converted to aminoalkanesulfonamide compounds. The reaction product is then stripped of excess ammonia or amines and washed with hot water to remove the hydrochloride salt formed in the reaction between the sulfonyl chloride compounds and the ammonia or amine to obtain a product mixture containing alkanesulfonamides and a minor quantity of aminoalkanesulfonamides. If it is desirable to separate the aminoalkanesulfonamides from the alkanesulfonamides contained in the mixture, the mixture is extracted with a dilute aqueous inorganic acid solution after the removal of excess ammonia or amine therefrom. Due to the insolubility of the alkanesulfonamide compounds in the inorganic acid solution as compared to the aminoalkanesulfonamide compounds the aminoalkanesulfonamides are readily extracted from the product mixture.

More specifically, the method of the present invention comprises reacting the alkanesulfonyl chloride reaction mixture produced by the sulfochlorination of a straight chain paraffin hydrocarbon with a nitrogen base compound selected from the group consisting of ammonia and amines. The reaction is carried out by adding the sulfonyl chloride reaction mixture to an excess of the nitrogen base compound at a pressure of about 1 to about 250 atmospheres (preferably from 1 to 20 atmospheres) and a temperature of from about −5° C. to 0° C. The reaction may be represented as follows wherein ammonia is utilized:

wherein R is a straight chain alkyl group.

After the sulfonyl chloride compounds have been reacted at the above-mentioned conditions, the resulting reaction mixture is heated to a temperature of from about 20 to about 200° C. at a pressure of from about 1 to about 350 atmospheres while being continuously stirred for a period of time such that the chain chlorinated alkanesulfonyl chloride compounds contained in the mixture are converted to aminoalkanesulfonamide compounds. This reaction may be represented as follows:

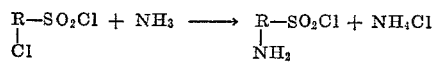

The product mixture resulting from the above reaction contains alkanesulfonamides, aminoalkanesulfonamides and excess ammonia or amine. The excess ammonia or amine may be removed in a conventional manner such as by evaporation and the product mixture may then be washed with hot water to remove the hydrochloride salt formed followed by drying by contact with a drying agent such as anhydrous sodium carbonate.

If it is desired to remove the aminoalkanesulfonamide compounds from the product mixture, this can be accomplished by extracting the mixture with a dilute aqueous inorganic acid solution such as aqueous solution of hydrochloric acid, hydrobromic acid or sulfuric acid. An acid concentration of from about 0.5% to about 5% by weight is satisfactory. In order to prevent emulsification of the extraction mixture a paraffin hydrocarbon such as pentane or hexane may be added to the product mixture prior to the extraction step. The hydrocarbon may then be removed from the extraction mixture in a conventional manner such as by evaporation.

In order to present a clear understanding of the method of the present invention the following examples are given:

EXAMPLE 1

This example illustrates the sulfochlorination of a normal paraffin hydrocarbon starting material.

2600 grams of normal hexadecane are weighed into a 4 liter resin flask. The hexadecane is first washed with two successive oleum washes in quantities equivalent to 5 weight percent of the hexadecane in order to remove aromatic impurities therefrom, followed by an aqueous caustic wash and drying. The resin flask is equipped with a stirrer, thermometer, fritted glass tube extending to the bottom, and a conventional mercury vapor tube. Chlorine and sulfur dioxide gas sources are connected to the fritted glass tube through individual conventional flow meters.

Stirring is started, the mercury vapor light turned on and chlorine and sulfur dioxide gas introduction is started. Chlorine is introduced at the rate of 137 grams/hour and sulfur dioxide is introduced at the rate of 471 grams/hour. The total reaction time is one hour and 47 minutes. The flask is first saturated with sulfur dioxide before the chlorine introduction is begun. The temperature is maintained at 25° C. to 35° C. throughout the reaction and at the reaction time, the crude reaction mixture is purged with nitrogen gas for two hours and transferred to a separatory funnel. In order to stabilize the crude reaction mixture and remove impurities therefrom, the mixture is washed with water followed by stirring with 50 grams of anhydrous sodium carbonate. The reaction mixture is then dehydrated by filtering over anhydrous sodium sulfate.

EXAMPLE 2

This example illustrates the preparation of unsubstituted alkanesulfonamides from the hexadecane sulfonyl chlorides produced as described in Example 1.

After the evaporation of excess hexadecane from the sulfonyl chloride reaction mixture carried out under reduced pressure conditions of from about 2 to about 4 millimeters of mercury and at a maximum temperature of 65° C. to prevent thermal decomposition of the sulfonyl chloride compounds, approximately 500 milliliters of anhydrous ammonia are condensed in a two-liter three necked flask at a pressure of about 5 atmospheres. The flask is cooled by emersion in a bath containing a Dry Ice-isopropyl alcohol mixture to a temperature of 0° C. The flask is equipped with a stirrer, thermometer, addition funnel and a Dry Ice-acetone condenser. 315 grams of the hexadecane sulfonyl chloride mixture from Example 1 above are added to the flask over a period of one and three-quarter hours with stirring. After the addition of the hexadecane sulfonyl chloride mixture is completed, the mixture is stirred for an additional one-half hour. The resultant reaction mixture contains about 270 grams of hexadecanesulfonamide, 20 grams of chain chlorinated hexadecanesulfonamide, and excess anhydrous ammonia.

EXAMPLE 3

This example illustrates the conversion of the chain chlorinated hexadecanesulfonamide in the reaction mixture from Example 2 to aminohexadecanesulfonamide. The reaction mixture from Example 2 is heated to a temperature of 100° C. at a pressure of 150 atmospheres while being continuously stirred for one hour at the end of which time the chain chlorinated hexadecanesulfonamide compounds are converted to amino substituted sulfonamides.

EXAMPLE 4

This example illustrates the removal of the aminohexadecanesulfonamides from the reaction mixture produced in Example 3. The product mixture from Example 3 is transferred to a conventional evaporator wherein excess ammonia is removed. The resulting reaction mixture containing hexadecanesulfonamides and aminohexadecanesulfonamides is combined with an equal volume of hexane and extracted with a 5% by weight aqueous hydrochloric acid solution to remove the aminoalkanesulfonamides therefrom. The hexane is then evaporated from the extracted mixture and the mixture is washed with hot water and dried with anhydrous sodium carbonate.

While particular embodiments of the invention have been described, it will be understood by those skilled in the art that the invention is not limited thereto since many modifications may be made. Such modifications as fall within the true spirit and scope of the invention as defined by the appended claims and reasonable equivalents thereto are included as a part thereof.

What is claimed is:

1. In a method of preparing alkanesulfonamides from the alkanesulfonyl chloride reaction mixture obtained by the sulfochlorination of a paraffin hydrocarbon wherein the alkanesulfonyl chloride mixture is added to an excess of a nitrogen base compound selected from the group consisting of ammonia and amines at a pressure of from about 1 to about 250 atmospheres and a temperature of from about $-5°$ C. and about $0°$ C. to form an alkanesulfonamide product mixture substantially free of disulfonimide compounds, the improvement which comprises:
    heating said alkanesulfonamide product mixture to a temperature of from about 20 to about 200° C. at a pressure of from about 1 to about 350 atmospheres for a period of time sufficient to convert chain chlorinated alkanesulfonamide compounds contained in said product mixture to aminoalkanesulfonamides.

2. The method of claim 1 which is further characterized to include the steps of:
    removing the excess of said nitrogen base compound from said product mixture; and
    extracting the product mixture with an aqueous acid solution to remove said aminoalkanesulfonamides therefrom.

3. The method of claim 2 wherein the step of removing the excess of said nitrogen base compound from said product mixture is carried out by evaporating the nitrogen base compound and separating it from said mixture.

4. The method of claim 3 wherein the aqueous acid solution utilized for extracting said aminoalkanesulfonamides from said product mixture is a dilute aqueous solution of an inorganic acid.

5. A method of preparing a high purity alkanesulfonamide product mixture from the alkanesulfonyl chloride reaction mixture obtained by the sulfochlorination of a praffin hydrocarbon comprising the steps of:
    (a) reacting said alkanesulfonyl chloride reaction mixture with an excess of a nitrogen base compound selected from the group consisting of ammonia and amines at a pressure of from about 1 to about 20 atmospheres and a temperature of from about $-50°$ C. to about $0°$ C. to form an alkanesulfonamide reaction mixture substantially free of disulfonamide compounds;
    (b) heating the alkanesulfonamide mixture produced in step (a) to a temperature of from about 20° C. to about 200° C. at a pressure of from about 1 to about 350 atmospheres for a period of time sufficient to convert chain chlorinated alkanesulfonamide compounds contained in said mixture to aminoalkanesulfonamides;
    (c) evaporating the excess of said nitrogen base compounds from the mixture produced in step (b); and
    (d) extracting the mixture from step (c) with an aqueous acid solution to remove said aminoalkanesulfonamides therefrom.

6. The method of claim 5 wherein the aqueous acid solution utilized for extracting said aminoalkanesulfonamides from said mixture is a dilute aqueous solution of inorganic acid seelcted from the group consisting of hydrochloric acid, hydrobromic acid and sulfuric acid.

References Cited
UNITED STATES PATENTS

| | | | |
|---|---|---|---|
| 2,334,186 | 11/1943 | Fox | 260—556 A |
| 2,361,188 | 10/1944 | Fox | 260—556 A |
| 2,361,457 | 10/1944 | Clark | 260—585 A |
| 2,448,910 | 9/1948 | Reamer | 260—585 A |
| 3,657,347 | 4/1972 | Muller et al. | 260—585 A |

OTHER REFERENCES

F. Asinger, Paraffins, Chemistry & Technology, Pergamon Press, New York (English Translation). p. 557.

HENRY R. JILES, Primary Examiner

S. D. WINTERS, Assistant Examiner

UNITED STATES PATENT OFFICE
CERTIFICATE OF CORRECTION

Patent No. 3,755,439        Dated August 28, 1973

Inventor(s) Carl D. Kennedy

It is certified that error appears in the above-identified patent and that said Letters Patent are hereby corrected as shown below:

Column 6, line 8, "praffin" should be --paraffin--

Column 6, line 13, "-50°" should be -- -5° --

Column 6, line 32, "selected" should be --selected--

Signed and sealed this 21st day of May 1974.

(SEAL)
Attest:

EDWARD M. FLETCHER, JR.
Attesting Officer

C. MARSHALL DANN
Commissioner of Patents